United States Patent
Mohajer et al.

(10) Patent No.: US 11,830,472 B2
(45) Date of Patent: Nov. 28, 2023

(54) TRAINING A DEVICE SPECIFIC ACOUSTIC MODEL

(71) Applicant: SOUNDHOUND, INC., Santa Clara, CA (US)

(72) Inventors: Keyvan Mohajer, Los Gatos, CA (US); Mehul Patel, Saratoga, CA (US)

(73) Assignee: SOUNDHOUND AI IP, LLC, Santa Clara, CA (US)

( * ) Notice: Subject to any disclaimer, the term of this patent is extended or adjusted under 35 U.S.C. 154(b) by 0 days.

(21) Appl. No.: 17/573,551

(22) Filed: Jan. 11, 2022

(65) Prior Publication Data

US 2022/0130390 A1 Apr. 28, 2022

Related U.S. Application Data

(63) Continuation of application No. 17/237,003, filed on Apr. 21, 2021, now Pat. No. 11,367,448, which is a
(Continued)

(51) Int. Cl.
*G10L 15/22* (2006.01)
*G06F 3/16* (2006.01)
*G10L 15/18* (2013.01)

(52) U.S. Cl.
CPC .............. *G10L 15/22* (2013.01); *G06F 3/167* (2013.01); *G10L 15/18* (2013.01)

(58) Field of Classification Search
None
See application file for complete search history.

(56) References Cited

U.S. PATENT DOCUMENTS 6,442,512 B1 *  8/2002  Sengupta ................ G06F 9/451
                                                            703/2
6,477,493 B1 * 11/2002  Brooks ................. G10L 15/063
                                                            704/270
(Continued)

FOREIGN PATENT DOCUMENTS

CN        101923854 A      12/2010
CN        103038817 A       4/2013
(Continued)

OTHER PUBLICATIONS

Microsoft.com, Microsoft Cognitive Services, Create custom acoustic models, 1 page (accessed Feb. 8, 2017, www.microsoft.com/cognitiveservices/en-us/customrecognitionintelligentservicecris).
(Continued)

*Primary Examiner* — Jakieda R Jackson
(74) *Attorney, Agent, or Firm* — Haynes Beffel & Wolfeld LLP; Andrew L. Dunlap; Franklin M. Schellenberg

(57) ABSTRACT

Developers can configure custom acoustic models by providing audio files with custom recordings. The custom acoustic model is trained by tuning a baseline model using the audio files. Audio files may contain custom noise to apply to clean speech for training. The custom acoustic model is provided as an alternative to a standard acoustic model. Device developers can select an acoustic model by a user interface. Speech recognition is performed on speech audio using one or more acoustic models. The result can be provided to developers through the user interface, and an error rate can be computed and also provided.

4 Claims, 9 Drawing Sheets

Related U.S. Application Data continuation of application No. 15/996,393, filed on Jun. 1, 2018, now Pat. No. 11,011,162.

(56) References Cited

U.S. PATENT DOCUMENTS

| | | | |
|---|---|---|---|
| 6,584,439 B1* | 6/2003 | Geilhufe | G10L 15/26 704/E15.045 |
| 6,842,734 B2 | 1/2005 | Yamada et al. | |
| 7,437,294 B1 | 10/2008 | Thenthiruperai | |
| 7,720,683 B1 | 5/2010 | Vermeulen et al. | |
| 9,208,781 B2 | 12/2015 | Bell et al. | |
| 9,263,040 B2 | 2/2016 | Tzirkel-Hancock et al. | |
| 9,443,527 B1 | 9/2016 | Watanabe et al. | |
| 9,460,716 B1 | 10/2016 | Epstein et al. | |
| 9,691,384 B1 | 6/2017 | Wang et al. | |
| 9,881,255 B1* | 1/2018 | Castellanos | G06F 16/9574 |
| 10,152,968 B1* | 12/2018 | Agrusa | G06F 3/167 |
| 10,319,250 B2 | 6/2019 | Lokeswarappa et al. | |
| 10,326,657 B1* | 6/2019 | A | H04L 41/0859 |
| 10,410,635 B2 | 9/2019 | Mont-Reynaud | |
| 10,424,292 B1 | 9/2019 | Thimsen et al. | |
| 2002/0055840 A1 | 5/2002 | Yamada et al. | |
| 2002/0169604 A1 | 11/2002 | Damiba et al. | |
| 2003/0050783 A1 | 3/2003 | Yoshizawa | |
| 2003/0074648 A1* | 4/2003 | Brassard | G06F 8/10 717/104 |
| 2003/0130840 A1 | 7/2003 | Forand | |
| 2003/0191636 A1 | 10/2003 | Zhou | |
| 2005/0114128 A1 | 5/2005 | Tetherington et al. | |
| 2005/0187763 A1 | 8/2005 | Arun | |
| 2006/0053014 A1 | 3/2006 | Yoshizawa | |
| 2006/0074651 A1 | 4/2006 | Arun | |
| 2006/0235687 A1 | 10/2006 | Carus et al. | |
| 2008/0004875 A1 | 1/2008 | Chengalvarayan et al. | |
| 2009/0254753 A1* | 10/2009 | De Atley | G06F 21/51 713/176 |
| 2009/0313004 A1* | 12/2009 | Levi | G06F 8/30 717/106 |
| 2010/0145699 A1 | 6/2010 | Tian | |
| 2010/0228548 A1 | 9/2010 | Liu et al. | |
| 2010/0268534 A1* | 10/2010 | Kishan Thambiratnam | G10L 15/07 704/235 |
| 2010/0312555 A1 | 12/2010 | Plumpe et al. | |
| 2010/0312557 A1 | 12/2010 | Strom et al. | |
| 2011/0066433 A1 | 3/2011 | Ljolje et al. | |
| 2011/0295590 A1 | 12/2011 | Lloyd et al. | |
| 2013/0013991 A1* | 1/2013 | Evans | H04N 21/4828 715/250 |
| 2014/0007222 A1* | 1/2014 | Qureshi | H04L 67/10 726/16 |
| 2014/0020061 A1* | 1/2014 | Popp | H04W 12/35 726/3 |
| 2014/0039888 A1 | 2/2014 | Taubman et al. | |
| 2014/0142944 A1 | 5/2014 | Ziv et al. | |
| 2014/0214414 A1 | 7/2014 | Poliak | |
| 2014/0278415 A1 | 9/2014 | Ivanov et al. | |
| 2014/0365221 A1* | 12/2014 | Ben-Ezra | G10L 15/25 704/256.1 |
| 2014/0372118 A1 | 12/2014 | Yassa et al. | |
| 2015/0012268 A1 | 1/2015 | Nakadai et al. | |
| 2015/0058003 A1 | 2/2015 | Mohideen et al. | |
| 2015/0081300 A1 | 3/2015 | Kim | |
| 2015/0149174 A1 | 5/2015 | Gollan et al. | |
| 2015/0161999 A1* | 6/2015 | Kalluri | G06F 16/433 704/257 |
| 2015/0301795 A1 | 10/2015 | Lebrun | |
| 2015/0364139 A1 | 12/2015 | Dimitriadis et al. | |
| 2016/0234206 A1 | 8/2016 | Tunnell et al. | |
| 2016/0372107 A1* | 12/2016 | Dow | G06F 16/685 |
| 2017/0109368 A1 | 4/2017 | Mohajer | |
| 2018/0121170 A1* | 5/2018 | Subramaniyan | G06F 9/541 |
| 2018/0213339 A1 | 7/2018 | Shah et al. | |
| 2018/0286413 A1 | 10/2018 | Hassani et al. | |
| 2018/0330737 A1 | 11/2018 | Paulik et al. | |
| 2019/0051290 A1* | 2/2019 | Li | G10L 25/30 |
| 2019/0138940 A1* | 5/2019 | Feuz | G06F 9/46 |
| 2019/0185013 A1 | 6/2019 | Zhou et al. | |
| 2019/0206389 A1* | 7/2019 | Kwon | G10L 15/075 |
| 2019/0287515 A1* | 9/2019 | Li | G10L 15/063 |
| 2019/0295539 A1* | 9/2019 | Mese | G10L 15/01 |
| 2021/0012769 A1 | 1/2021 | Vasconcelos et al. | |
| 2021/0065712 A1 | 3/2021 | Holm | |
| 2021/0118435 A1 | 4/2021 | Stahl | |
| 2021/0256386 A1 | 8/2021 | Wieman et al. | |
| 2021/0272552 A1 | 9/2021 | Lokeswarappa et al. | |
| 2021/0312920 A1 | 10/2021 | Stahl | |
| 2021/0335340 A1 | 10/2021 | Gowayyed et al. | |

FOREIGN PATENT DOCUMENTS

| | | |
|---|---|---|
| CN | 103714812 A | 4/2014 |
| CN | 107958385 A | 4/2018 |
| CN | 113270091 A | 8/2021 |
| EP | 3783605 A1 | 2/2021 |
| JP | 2000353294 A | 12/2000 |
| JP | 2003177790 A | 6/2003 |
| JP | 2005181459 A | 7/2005 |
| JP | 2008158328 A | 7/2008 |
| WO | 2005010868 A1 | 2/2005 |

OTHER PUBLICATIONS

Microsoft.com, Custom Speech Service, Creating a custom acoustic model, Jun. 27, 2017, 39 pages.

Microsoft.com, Design Windows 10 devices, May 2, 2107, 917 pages.

Amazon, SpeechRecognizer Interface, Profiles, 9 pages, (accessed Jan. 16, 2018, https://developer.amazon.com/docs/alexa-voice-service/speechrecognizer.html).

Amazon, Audio Hardware Configurations, Automatic Speech Recognition Profiles, 3 pages, (accessed Jan. 16, 2018, developer.amazon.com/docs/alexa-voice-service/audio-hardware-configurations.html#asr).

Freesound.org, About Freesound, 1 page, (accessed Feb. 8, 2017, freesound.org/help/about/).

Asma Rabaoui, Hidden Markov Model Environment Adaptation for Noisy Sounds in a Supervised Recognition System, 2nd International Symposium on Communication, Control and Signal Processing (ISCCSP). Mar. 13-15, 2006, 4 pages.

Goshu Nagino, Design of Ready-Made Acoustic Model Library by Two-Dimensional Visualization of Acoustic Space, Eighth International Conference on Spoken Language Processing. Oct. 4-8, 2004, 4 pages.

JP Application No. 2019-29710, Notice of Refusal dated Nov. 23, 2020, 16 pages (retrieved from Global Dossier).

JP Application No. 2019-29710, Response to Notice of Refusal dated Nov. 23, 2020, filed Jan. 3, 2021, 10 pages (retrieved from Global Dossier).

JP Application No. 2019-29710, Search Report dated Apr. 1, 2020, 46 pages (retrieved from Global Dossier).

JP Application No. 2019-29710, Notice of Grant dated Mar. 3, 2021, 5 pages (retrieved from Global Dossier).

Mirsamadi, S. et al., "On Multi-Domain Training and Adaptation of End-to-End RNN Acoustic Models for Distant Speech Recognition," Interspeech 2017, Center for Robust Speech Systems, University of Texas, Aug. 20-24, 2017, pp. 404-408.

Mdhaffar et al., Retrieving Speaker Information from Personalized Acoustic Models for Speech Recognition, LIA, Avignon University, France, (arXiv preprint arXiv:2111.04194 ), dated Nov. 7, 2021, 5 pages.

McGraw, I et al., "Personalized Speech Recognition on Mobile Devices," 2016 IEEE International Conference on Acoustics, Speech and Signal Processing (ICASSP), IEEE Explore, Mar. 11, 2016, pp. 5955-5959.

Amazon, What devices does Amazon Transcribe work with, Amazon FAQs, 1 page. Retrieved on Jan. 6, 2022. Retrieved from the internet [URL: https://aws.amazon.com/transcribe/faqs/ ].

(56) References Cited

OTHER PUBLICATIONS

Microsoft, What is Custom Speech?, dated Nov. 3, 2021, 2 pages. Retrieved on Nov. 4, 2021. Retrieved from the internet [URL: https://docs.microsoft.com/en-us/azure/cognitive-services/].

Microsoft, Prepare data for Custom Speech, dated Nov. 3, 2021, 14 pages. Retrieved on Nov. 4, 2021. Retrieved from the internet [URL: https://docs.microsoft.com/en-us/azure/cognitive-services/].

Microsoft, Inspect Custom Speech data, dated Nov. 3, 2021, 5 pages. Retrieved on Nov. 4, 2021. Retrieved from the internet [URL: https://docs.microsoft.com/en-us/azure/cognitive-services/].

Microsoft, Evaluate and improve Custom Speech accuracy, dated Nov. 3, 2021, 9 pages. Retrieved on Nov. 4, 2021. Retrieved from the internet [URL: https://docs.microsoft.com/en-us/azure/cognitive-services/].

Microsoft, Train and deploy a Custom Speech model, dated Nov. 3, 2021, 5 pages. Retrieved on Nov. 4, 2021. Retrieved from the internet [URL: https://docs.microsoft.com/en-us/azure/cognitive-services/].

Siri Team, "Hey Siri: An On-device DNN-powered Voice Trigger for Apple's Personal Assistant," Speech and Natural Language Processing, Apple, Oct. 2017, 14 pages, accessed Jan. 6, 2022, retrieved from the internet [URL: https://machinelearning.apple.com/research/hey-siri].

Jahgirdar et al., Build a custom speech-to-text model with speaker diarization capabilities, IBM, dated Jul. 20, 2020, 4 pages. Retrieved on Jan. 6, 2022. Retrieved from the internet [URL: https://developer.ibm.com/].

Jahgirdar et al., Build custom Speech to Text model with speaker diarization capabilities, Github, 14 pages. Retrieved on Jan. 6, 2022. Retrieved from the internet [URL: https://github.com/IBM/build-custom-stt-model-with-diarization ].

Anchal Bhalla, Building Custom Speech Recognition Models Within Minutes, Medium.com, dated Aug. 26, 2019, 8 pages. Retrieved on Jan. 6, 2022. Retrieved from the internet [URL: https://medium.com/ibm-watson/building-custom-speech-recognition-models-within-minutes-33221c1ed8f8 ].

CMUSphinx, Adapting the default acoustic model, Github, 4 pages. Retrieved on Jan. 6, 2022. Retrieved from the Internet [URL: https://cmusphinx github.io ].

CMUSphinx, Training an acoustic model for CMUSphinx, Github, 10 pages. Retrieved on Jan. 6, 2022. Retrieved from the internet [URL: https://cmusphinx.github.io ].

* cited by examiner

TRAINING A DEVICE SPECIFIC ACOUSTIC MODEL

This application is a continuation of pending U.S. patent application Ser. No. 17/237,003 filed Apr. 21, 2021, which is a continuation of U.S. patent application Ser. No. 15/996,393 filed Jun. 1, 2018 and granted as U.S. Pat. No. 11,011,162.

BACKGROUND

The technology disclosed relates to automatic speech recognition (ASR). In particular, the technology disclosed relates to creation, identification, selection and implementation of custom acoustic models in intelligent speech recognition systems.

Speech recognition systems have become more prevalent in today's society. More and more everyday devices, such as appliances, vehicles, mobile devices, etc., are being equipped with speech recognition capabilities. The problem is that these everyday devices are not able to provide meaningful responses based on received speech audio from the user. One of the root causes of this problem is that the everyday devices and/or local or remote services connected thereto are not able to accurately convert the received speech audio to appropriate transcriptions. Typically, the received speech audio is converted to phonemes using an acoustic model. However, these everyday devices and/or local or remote services connected thereto are using acoustic models that are not tailored to their (i) environment, (ii) expected use conditions and/or (iii) expected use case results. Therefore, these everyday devices that are enabled with speech recognition are not able to accurately recognize the received speech audio into a reliable transcription, from which helpful results can be communicated back to the user, and according to which the user or the user's device can appropriately respond.

An example of this problem is provided below. Suppose a coffee shop decides to upgrade their espresso machine to a brand new high-tech machine that is voice activated (i.e., that incorporates a speech recognition system). The acoustic model that is implemented by the espresso machine is generic and it has not been customized to the environment to which it is being used. This particular coffee shop has a minimalistic industrial decor, causing sounds to echo and reverberate much more than what is typical in other environments. Further, the espresso machine is located, such that the area for taking a customer's order is on one side of the espresso machine, there is a sink in front of the espresso machine and the bean grinder is on the other side of the espresso machine. Needless to say, there is a lot of background noise that is received by the speech recognition system of the espresso machine. Additionally, the temperature of the coffee shop tends to be on the warm side and the components of the espresso machine become extremely hot due to constant use. These temperatures cause the characteristics of the one or more microphones and the related electrical components to behave outside of what is considered normal. All of these factors coupled with the generic acoustic model cause the espresso machine to have terribly inaccurate transcriptions and responses to the point that it is impractical to use the speech recognition features of the espresso machine.

These problems provide an opportunity to develop a technology that is capable of implementing acoustic models can be tailored to specific devices and can be tailored based on various environmental and operating conditions, such as those mentioned above. The technology disclosed solves these problems and is able to provide a more accurate speech recognition system and meaningful results.

SUMMARY

Generally, the technology disclosed relates to automatic speech recognition (ASR) for analyzing utterances. In particular, the technology disclosed relates to identifying, selecting and implementing acoustic models in a speech recognition system, so that meaningful results can be provided to the end user. The technology disclosed is able to determine which acoustic model should be implemented when speech audio is received along with other data (i.e., metadata) that indicates a type of device and/or one or more conditions of the device (e.g., an end user device, such as an espresso machine or a washing machine or a vehicle). The technology disclosed also provides a speech recognition system that has an interface that allows a product manufacturer or developer to select which types of acoustic models should be implemented or should most likely be implemented to be able to provide meaningful results.

Particular aspects of the technology disclosed are described in the claims, specification and drawings.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

Figure 1:
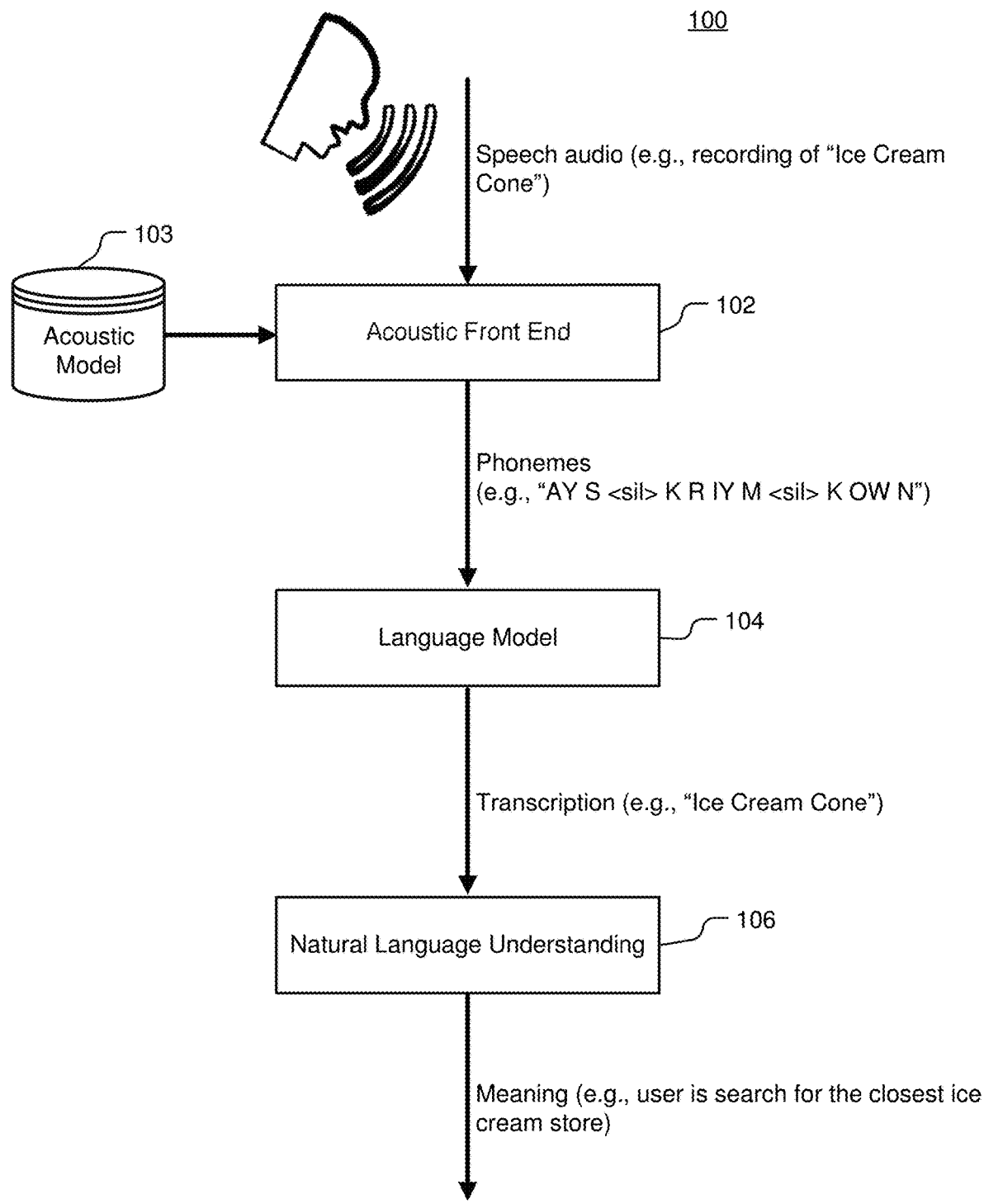
FIG. 1 is a block diagram that illustrates a general framework implemented by a speech recognition and natural language understanding system.

FIG. 1 is a block diagram that illustrates a general framework implemented by a speech recognition and natural language understanding system (e.g., a natural language understanding platform/server). In state of the art implementations of speech recognition and natural language understanding systems, speech recognition is typically applied first to produce a sequence of words or a set of word sequence hypotheses. Sometimes, this type of system is referred to as a combination of acoustic recognition and language, or linguistic, recognition. Speech recognition output is sent to the NLU system to extract the meaning.

Referring to FIG. 1, the general framework 100 includes receiving speech audio that includes natural language utterances. An example of speech audio would be a recording of a person speaking the phrase "ice cream cone." The speech audio can be received from any source (e.g., a mobile phone, a washing machine, a vehicle, etc.).

The speech audio is then analyzed by an acoustic front end 102, using an acoustic model 103 to extract phonemes from the speech audio. This is often times referred to as acoustic recognition. An example of this operation would be generating the phonemes "AY S<sil>K R IY M<sil>K OW N" (represented by the Carnegie Mellon University (CMU) Phoneme Set) based on the received speech audio.

Next, the phonemes generated by the acoustic front end 102 are received by a language model 104, which can be implemented to transcribe the detected phonemes (e.g., "AY S<sil>K R IY M<sil>K OW N") into an actual sentence, such as "ice cream cone." Transcribing the phonemes into a transcription is not a simple process and various factors come into play.

Once one or more transcription is determined, natural language understanding 106 is performed by an NLU system to extract meaning from the transcription "ice cream cone." Oftentimes meaning is associated with the transcription based on the domain or vertical or based on surrounding context. For example, if the vertical is related to searching for food, or more specifically, searching for places that serve food, then the meaning applied to the transcription "ice cream cone" could implement a search for local (nearest) places that serve ice cream for immediate consumption. In contrast, if the vertical is associated with places that sell food for later consumption (e.g., a grocery store) then the meaning would result in a search for grocery stores or markets that sell ice cream cones.

The technology disclosed is focused on creating, selecting and implementing the best acoustic model to create phonemes from received speech. Much effort has previously been put into determining the best transcriptions and the best meanings, but not much effort has previously been put into determining the best or most appropriate acoustic model to implement at any given time.

Figure 2:
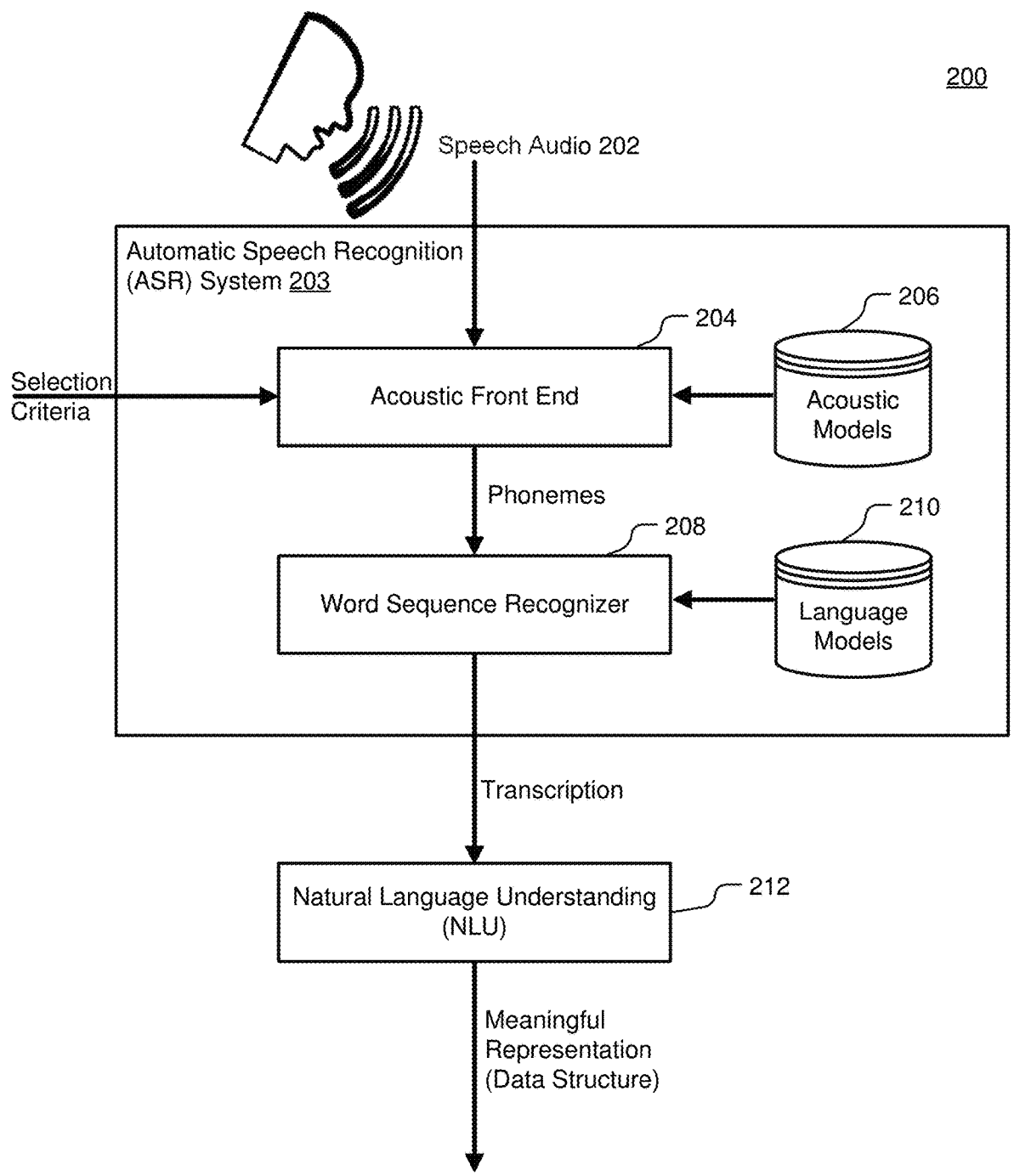
FIG. 2 is a block diagram that illustrates an example embodiment of the interaction between acoustic models and language models for natural language understanding (NLU).

FIG. 2 is a block diagram that illustrates an example embodiment of the interaction between acoustic models and language models for natural language understanding. FIG. 2 is simply a more detailed version of FIG. 1 and illustrates an example process or flow from receiving speech audio from a user to determining a meaningful response to the user. While the technology disclosed focuses on the creation, selection and implementation of custom acoustic models, FIG. 2 provides a nice example framework of the various steps and processing required to perform natural language understanding (NLU). All of the operations described with reference to FIG. 2 are not necessary to implement the technology disclosed. The technology disclosed is capable of performing the creation, selection and implementation of custom acoustic models in many different ways, some of which coincide with the description of FIG. 2 and some of which do not coincide with the description of FIG. 2.

Example embodiment 200, includes an automatic speech recognition (ASR) system 203, which includes an acoustic front end 204, acoustic models 206, a word sequence recognizer 208 and language models 210. The example embodiment 200 also includes natural language understanding 212. When a person speaks, speech audio 202 including natural language utterances are input into the acoustic front end 204. The acoustic front end 204 processes acoustic features of the speech audio 202 using one or more acoustic models 206. The ASR system 203 can also receive selection criteria (e.g., metadata) that is used to assist, for example, the acoustic front end 204 in making a selection of an acoustic model from the one or more acoustic models 206. Further, the acoustic front end generates one or more phoneme sequences.

The word sequence recognizer 208 receives the one or more phoneme sequences from the acoustic front end 204 and implements one or more language models from the language models 210 to transcribe the phonemes. The ASR system 203 can implement various types of scoring systems to determine the best phonemes and/or transcriptions. For example, each possible phoneme sequence can be associated with a score indicating the probability that the sequence is the most likely intended sequence. For example, a speaker may say, "I read a good book." Table 1 (below) shows example alternate phoneme sequences with scores that might be generated by the acoustic front end 204. The phoneme sequences can be represented using a phoneme set such as Carnegie Mellon University (CMU) Phoneme Set, or any other phonetic representation.

TABLE 1

| Phoneme sequences generated by Speech Engine Front End | |
|---|---|
| Phoneme Sequence | Score |
| AY + R EH D + AH + G EH D + B UH K | 0.000073034 |
| AY + R EH D + AH + G UH D + B UH K | 0.000083907 |
| AH + R EH D + AH + G UH D + B UH K | 0.000088087 |

As seen in Table 1, certain phonemes are bolded to call attention to the differences between these three very similar phonetic sequences. Thought it is an incorrect transcription, the third alternative phoneme sequence has the highest acoustic score. This type of error occurs in cases of noise, accents, or imperfections of various speech recognition systems. This is an example of why it is beneficial to implement a proper acoustic model.

Next, the natural language understanding (NLU) 212 is performed on the transcription to eventually come up with a meaningful representation (or a data structure) of the speech audio 202.

The technology disclosed relates to selecting customer acoustic models (e.g., acoustic models 206) to be implemented by, for example, the acoustic front end 204). The selected custom acoustic model can be implemented in an environment such as example embodiment 200, or in any other framework that would be apparent to a person of skill in the art.

Figure 3:
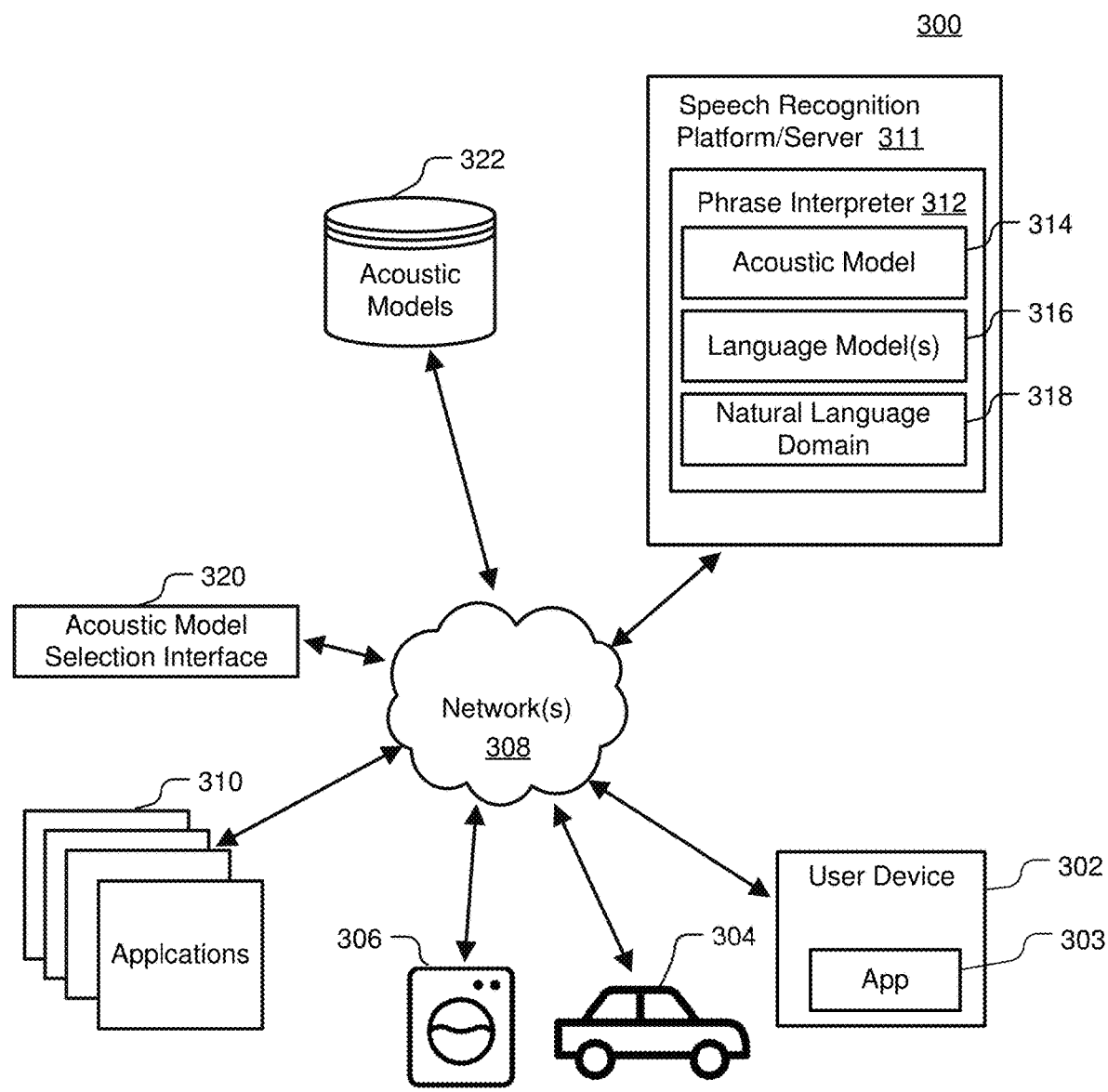
FIG. 3 illustrates a diagram of an example environment in which various acoustic models can be implemented.

FIG. 3 illustrates a diagram of an example environment 300 in which various acoustic models can be implemented. The environment 300 includes at least one user device 302, 304, 306. The user device 302 could be a mobile phone, tablet, workstation, desktop computer, laptop or any other type of user device running an application 303. The user device 304 could be an automobile and the user device 306 could be a washing machine, each of which is running an application 303. Various example implementations of these user devices are discussed in more detail below. The user devices 302, 304, 306 are connected to one or more communication networks 308 that allow for communication between various components of the environment 300. In one implementation, the communication networks 308 include the Internet. The communication networks 308 also can utilize dedicated or private communication links that are not necessarily part of the Internet. In one implementation the communication networks 308 uses standard communication technologies, protocols, and/or inter-process communication technologies.

The environment 300 also includes applications 310 that can be preinstalled on the user devices 302, 304, 306 or updated/installed on the user devices 302, 304, 306 over the communications networks 308. The environment 300 also includes a speech recognition platform/server 311, which is part of the speech recognition system. The speech recognition platform/server 311 can be a single computing device (e.g., a server), a cloud computing device, or it can be any combination of computing device, cloud computing devices, etc., that are capable of communicating with each other to perform the various tasks required to perform meaningful speech recognition. The speech recognition platform/server 311 includes a phrase interpreter 312 that performs, for example, the functions of the general framework 100 discussed above with reference to FIG. 1. Since the speech recognition platform/server 311 can be spread over multiple servers and/or cloud computing device, the operations of the phrase interpreter 312 can also be spread over multiple servers and/or cloud computing device. The applications 310 can be used by and/or in conjunction with the phrase interpreter 312 to understand spoken input. The various components of the environment 300 can communicate (exchange data) with each other using customized Application Program Interfaces (API) for security and efficiency.

The user devices 302, 304, 306, and the phrase interpreter 312 each include memory for storage of data and software applications, a processor for accessing data in executing applications, and components that facilitate communication over the network 308. The user devices 302, 304, 306 execute applications 303, such as web browsers (e.g., a web browser application 303 executing on the user device 302), to allow developers to prepare and submit applications 310 and allow users to submit speech audio including natural language utterances to be interpreted by the phrase interpreter 312. The phrase interpreter 312 essentially performs the functions of the general framework 100 discussed above with reference to FIG. 1.

The environment 300 also includes an acoustic model selection interface 320 that allows developers and/or users to select one or more appropriate acoustic models from a repository of acoustic models 322. The repository of acoustic models 322 are not necessarily stored at the same location and can be a collection of acoustic models from various sources and the acoustic models can be customized by the developer and/or end user, depending upon the particular implementation. The acoustic model selection interface 320 can be any type of interface that allows acoustic models to be chosen for implementation by the phrase interpreter 312 such as a browser or command line interface. Further, multiple acoustic models can be selected for implementation by the phrase interpreter 312 and the phrase interpreter 312 can intelligently select the best acoustic model to be implemented at any given point. Further details about the selection and implementation of the acoustic models are provided below with reference to other figures.

The phrase interpreter 312 implements one or more acoustic models 314, language models 316 and natural language domain 318. The acoustic models 314, as discussed above with reference to FIG. 1, can output phonemes and/or sound tokens. The language models 316 of the phrase interpreter 312 to create a transcription of the received speech audio. The language models 316 can be single stage or multiple stage models that add an application of separate linguistic analysis. For example, the acoustic models 314 can process received speech audio to produce phonemes. These phonemes can be passed to the language models 316 that consider and scores sequences of phonemes. The language models 316 can sometimes use diphone or triphone analysis to recognize likely sequences of phonemes. The language models 316 can use statistical language models to recognize statistically likely sequences of words.

The natural language domain 318 implemented by the phrase interpreter 312 is what adds real meaning to the transcription of the received speech audio. As mentioned above with reference to FIG. 1, the natural language domain 318 is able to put context and meaning to the transcription. As a brief example that is further expounded upon later in this document, let's say that the washing machine 306 transmits speech audio that says "please wash soccer jersey from today's game." Once the phrase interpreter 312 correctly generates the phonemes and transcription, the natural language domain 318 is able to apply meaning to the transcribed phrase by providing the washing machine with instructions to use cold water with extra-long soak and rinse cycles. Alternately, the natural language domain 318 can just send instructions to the washing machine 306 "wash soccer jersey" and then the washing machine 306 can intelligently decide which wash settings to implement.

The phrase interpreter 312 is implemented using at least one hardware component and can also include firmware, or software running on hardware. Software that is combined with hardware to carry out the actions of a phrase interpreter 312 can be stored on computer readable media such as rotating or non-rotating memory. The non-rotating memory can be volatile or non-volatile. In this application, computer readable media does not include a transitory electromagnetic signal that is not stored in a memory; computer readable media stores program instructions for execution. The phrase interpreter 312, as well as the acoustic model selection interface 320, the applications 310 and the repository of acoustic models 322 can be wholly or partially hosted and/or executed in the cloud or by other entities connected through the communications network 308.

Figure 4:
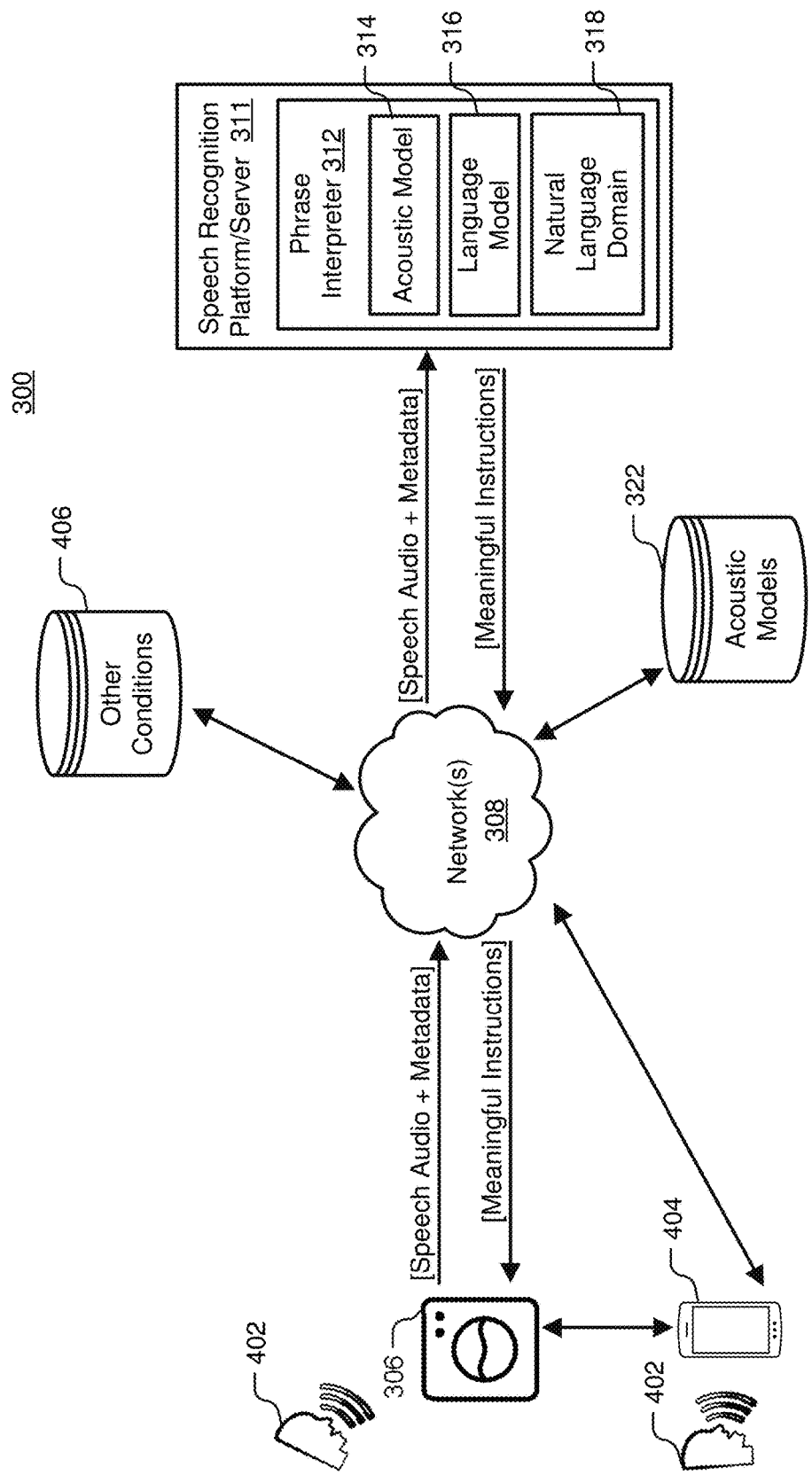
FIG. 4 illustrates an example implementation of the environment of FIG. 3, in which various acoustic models can be implemented.

FIG. 4 illustrates an example implementation of the environment of FIG. 3, in which various acoustic models can be implemented. In particular, FIG. 4 illustrates the environment 300 of FIG. 3 and additionally illustrates an example implementation in which a washing machine 306 is used as a client device for speech recognition. While FIG. 4 provides an example implementation of the washing machine 306 as the user device, any other user device can replace the washing machine 306. In other words, this example implementation is not limited to just a washing machine 306 as the user device.

Specifically, FIG. 4 illustrates that a user 402 communicates directly to the washing machine 306 using a microphone/speaker interface (not illustrated) and that the user 402 can communicate to the washing machine 306 using another electronic device, such as a mobile phone 404. As an example, the user 402 may communicate speech audio to the washing machine 306 as "please wash soccer jersey from today's game." Again, this speech audio can be directly communicated to the washing machine 306 or it can be communicated to the washing machine 306 via the mobile phone 404. The washing machine 306 then, via the communication networks 308, provides the recorded speech audio to the speech recognition platform/server 311 that performs speech recognition and natural learning understanding. Alternatively, the mobile phone 404 can also communicate the recorded speech audio to the speech recognition platform/server 311 via the communication networks 308. The speech recognition platform/server 311 then implements the phrase interpreter 312. Along with the speech audio, the washing machine 306 also transmits metadata. Note that the metadata can be transmitted from the washing machine 306 to the communication networks 308 and/or from the washing machine 306 to the mobile phone 404 and then from the mobile phone 404 to the communication networks 308. Other combinations of communications between the washing machine 306, the mobile phone 404 and the communications networks 308, for the purpose of getting the speech audio and the metadata communicated to the speech recognition platform/server 311 will be apparent to a person skilled in the art.

The phrase interpreter 312 then uses the metadata for selection of an appropriate acoustic model 314. The metadata can include any meaningful information that would assist in the selection of the appropriate acoustic model 314. For example, the metadata can include either or both of a device type and a specific device condition. Specifically, the metadata can include (i) a unique identification of the washing machine 306 (e.g., device type, model number, serial number, etc.), (ii) usage conditions, such as temperature and/or environmental conditions in the laundry room, (iii) other environmental conditions, such as outdoor weather, (iv) information that could affect the surrounding acoustics, (v) information related to other types of noises that could interfere with the accuracy of the acoustic model, (vi) current operating conditions of the washing machine 306 as well as operating conditions of other devices located nearby, such as a dryer or laundry tub, and (vii) information regarding one or more hardware and software components of the washing machine 306 or other components involved in the receiving of the speech audio and/or for providing audio feedback to the user. Generally, the ability of a system to optimize the choosing or adapting of an acoustic model is improved by having more metadata information with utterances.

Once the phrase interpreter 312 receives the speech audio and the metadata, the phrase interpreter 312 (or some other component of the overall system or platform that performs the speech recognition) can decide which acoustic model would be the best for extracting phonemes. Some embodiments use only the model number or device type of the washing machine 306, and the phrase interpreter 312 is able to select an acoustic model that has been created or tuned for that specific device type. The same goes for the other possibilities of metadata, as described above. Furthermore, if the user of the washing machine 306 can be identified, then an acoustic model that is tuned for that specific user's voice can be implemented. Note that different features of different acoustic models can be combined. For example, features that tune an acoustic model to a particular user's voice can be combined with features of an acoustic model that is tuned for dryer noise. This is a mix-and-match type acoustic model that is intelligently created and implemented in dependence upon many pieces of information included in the metadata and various different acoustic models that are at the disposal of the speech recognition platform/server 311.

A developer or subscriber to a speech recognition service has the ability to pre-select which acoustic models are available to implement for certain devices. The phrase interpreter 312 is able to store those pre-selected acoustic models and/or is able to obtain those pre-selected acoustic models from the repository of acoustic models 322. The phrase interpreter 312 can also obtain other conditions 406 that might be helpful in the selection of the best acoustic model 314. Once the phrase interpreter 312 receives the necessary information it is able to select the best acoustic model 314 for the job and then proceed to use the selected acoustic model 314 to generate the phonemes, then implement the language model 316 to transcribe the phonemes and then apply natural language domain 318 to be able to provide meaningful instructions.

The metadata can also include information that would assist in the natural language domain 318. For example, if the metadata included information indicating a certain type of weather (e.g., raining), then the phrase interpreter 312 could intelligently determine that the soccer jersey was most likely to be very muddy due to the weather conditions. The meaningful instructions provided by the phrase interpreter 312 could be instructions for the washing machine 306 to dispense a certain type of soap, to run extra cycles of washing and rinsing, to use certain temperatures of water, etc. Alternatively, the meaningful instructions provided by the phrase interpreter 312 could simply be "dirty sports uniform" and then the washing machine 306 would have to intelligently determine which wash cycles and options to implement. Either way, the most efficient and accurate way to be able to provide the meaningful instructions is to be able to select the appropriate acoustic model. If the acoustic model is not "tuned" or "trained" for the conditions in which the speech audio is received, then the likelihood of the language model 316 and the natural language domain 318 being successful is greatly reduced.

The meaningful information returned to the washing machine 306 and/or the user 402 can be a request for further clarification, etc. The user 402 and/or the washing machine 306 can then provide further information back to the phrase interpreter 312. Additionally, the other conditions 406 could be information that could be provided in the metadata by the washing machine 306, but could be learned from other sources (e.g., weather, calendar information of the user, etc.). For example, if the phrase interpreter 312 is able to know the approximate date/time of the soccer game and the location, it could be possible to more accurately know the weather, how long the stains have had to settle in and what type of ground (e.g., artificial grass, red dirt, etc.) might be on the soccer field.

Figure 5:
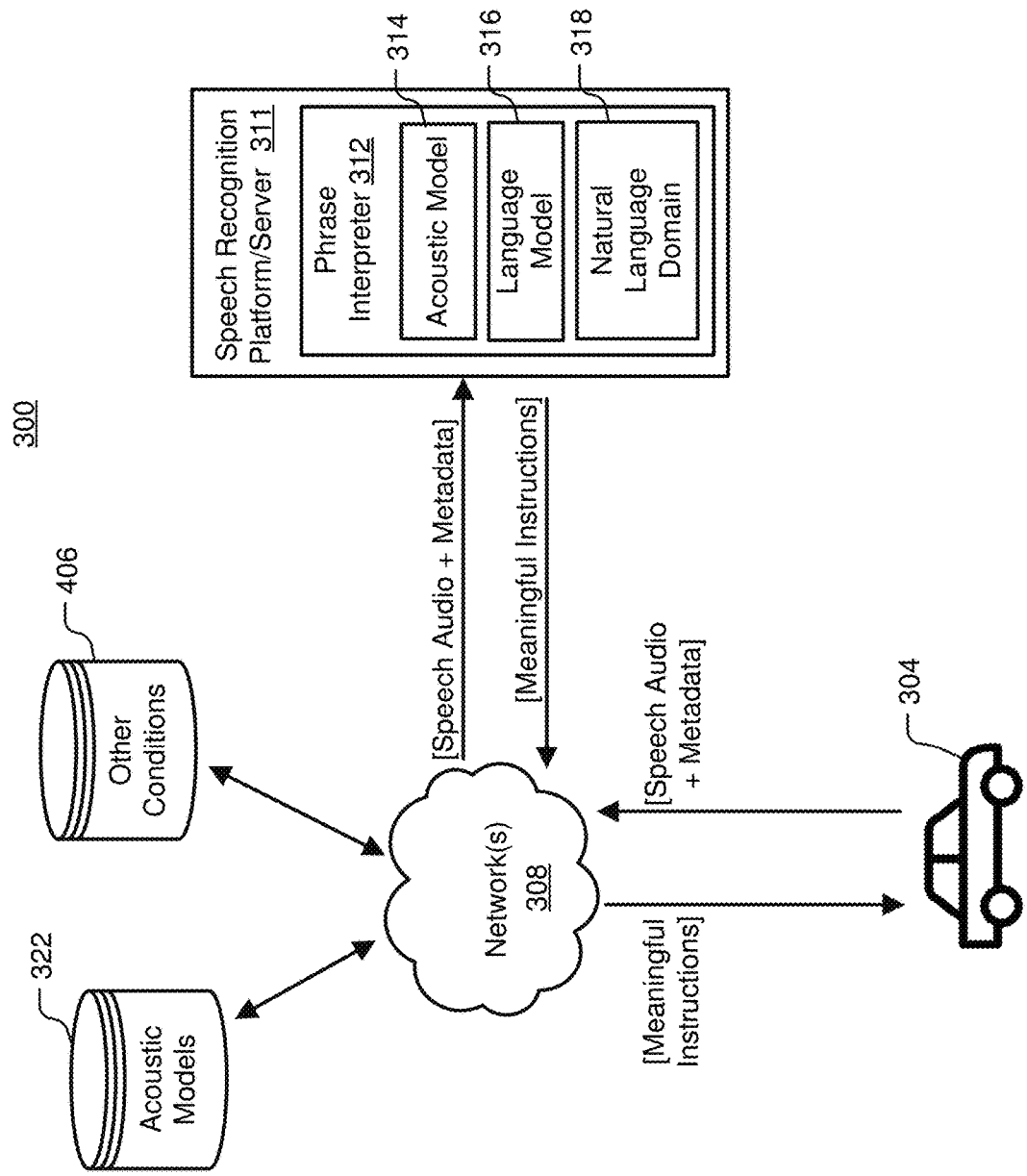
FIG. 5 illustrates an example implementation of the environment of FIG. 3, in which various acoustic models can be implemented.

FIG. 5 illustrates an example implementation of the environment of FIG. 3, in which various acoustic models can be implemented. In particular, FIG. 5 illustrates the environment 300 of FIG. 3 and further illustrates an example implementation in which a vehicle 304 is used as a client device for natural language recognition. While FIG. 5 provides an example implementation of the vehicle 304 as the user device, any other user device can replace the vehicle 304. In other words, this example implementation is not limited to just a vehicle 304 as the user device.

Specifically, FIG. 5 illustrates that a vehicle 304 is the user device and that the vehicle 304 transmits the speech audio and the metadata to the speech recognition platform/server 311 that performs the natural language understanding. Similar to the discussion above regarding FIG. 4, the speech audio and the metadata can be transmitted/received using a combination of communication devices such as the vehicle 304 itself as well as one or more mobile devices. This example with the vehicle 304 follows the same process as described above with respect to the washing machine 306, except that the conditions and meaningful instructions will be quite different. The vehicle 304 might have multiple microphones and speakers and different configurations of drivers and passengers, making it beneficial to identify the locations of the passenger or passengers that are speaking. Furthermore, the vehicle 304 is likely to encounter many different types of noise environments depending on its location and type of operation. There might be a traffic jam in downtown New York City, there could be a hail storm, there could be a crying infant, the vehicle could have its windows down, the radio could be on, it could be running at high rotations per minute (RPMs) or low RPMs, or the vehicle 304 could be in a tunnel. The vehicle 304 can be constantly monitoring all of these situations and storing the appropriate metadata that can be used when the user invokes speech recognition. Additionally, metadata can be gathered from a mobile device of the user, which can then be stored and/or transmitted by the vehicle 304.

As an example, a passenger in the back seat of the vehicle 304 may say "call Grandma Moses on her cell phone." Aside from the metadata discussed above regarding the washing machine 306, the metadata can include information such as which microphone and/or microphones were used to record the passenger's voice, whether or not the windows of the vehicle 304 were open or closed, whether the heating ventilation and air conditioning (HVAC) of the vehicle 304 was running at full blast, as well as any other information that could be collected that could affect the selection of the best acoustic model.

Figure 6:
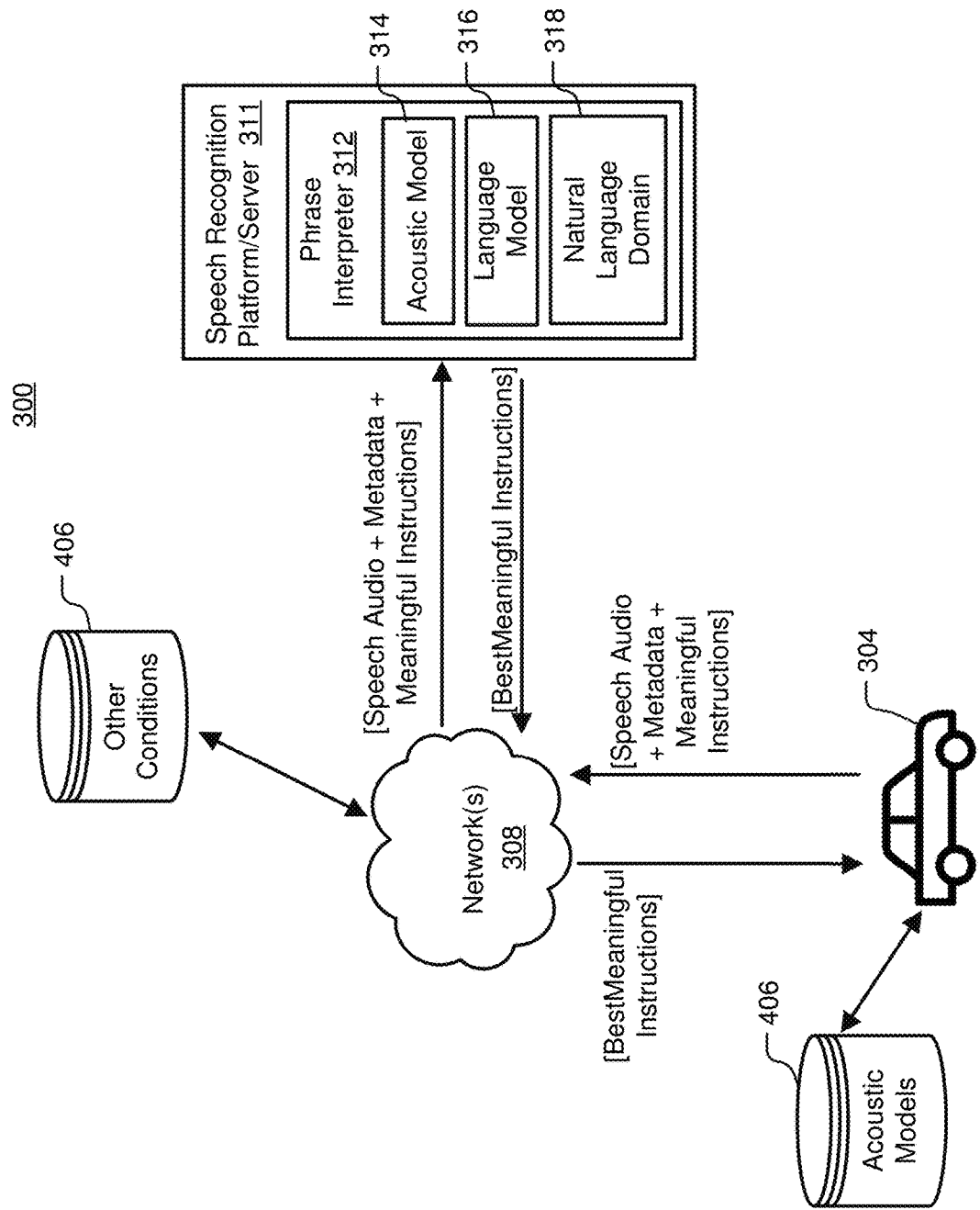
FIG. 6 illustrates an example implementation of the environment of FIG. 3, in which various acoustic models can be implemented.

FIG. 6 illustrates an example implementation of the environment of FIG. 3, in which various acoustic models can be implemented. In particular, FIG. 6 illustrates the environment 300 of FIG. 3 and further illustrates an example implementation in which a vehicle 304 is used as a client device for natural language recognition. While FIG. 6 provides an example implementation of the vehicle 304 as the user device, any other user device can replace the vehicle 304. In other words, this example implementation is not limited to just a vehicle 304 as the user device.

FIG. 6 is very similar to FIG. 5, except that different embodiments are illustrated.

One of the embodiments involves the vehicle 304 selecting an appropriate acoustic model from a set of locally stored acoustic models 322 and then coming up with meaningful instructions. This embodiment offloads the selection of the acoustic model from the speech recognition platform/server 311 and allows the vehicle 304 to select the best acoustic model. A developer and/or user can preconfigure the vehicle 304 with acoustic models that are customized for that vehicle 304 and then the vehicle can choose the acoustic model itself. As illustrated in FIG. 6, the vehicle 304 can store acoustic models 406 for implementation. The vehicle 304 can implement the acoustic model itself or it can transmit the acoustic model over the communication network 308.

In another embodiment, the vehicle 304 can (i) select and implement the acoustic model itself to obtain meaningful instructions and (ii) transmit the speech audio, the metadata and meaningful instructions to the speech recognition platform/server 311. Then the phrase interpreter 312 can consider the speech audio and metadata to make its own selection of an acoustic model 314 to develop meaningful results. The phrase interpreter 312 then can compare its own meaningful instructions with the meaningful instructions received from the vehicle 304 to determine the best meaningful instructions and then transmit the best meaningful instructions to the vehicle 304. This implementation would be beneficial in a situation where perhaps the speech recognition platform/server 311 has been updated with more accurate acoustic models or visa-versa.

The discussions regarding FIGS. 4-6 are merely examples, as the user devices implementing speech recognition can greatly vary and the pool of which is ever increasing.

Figure 7:
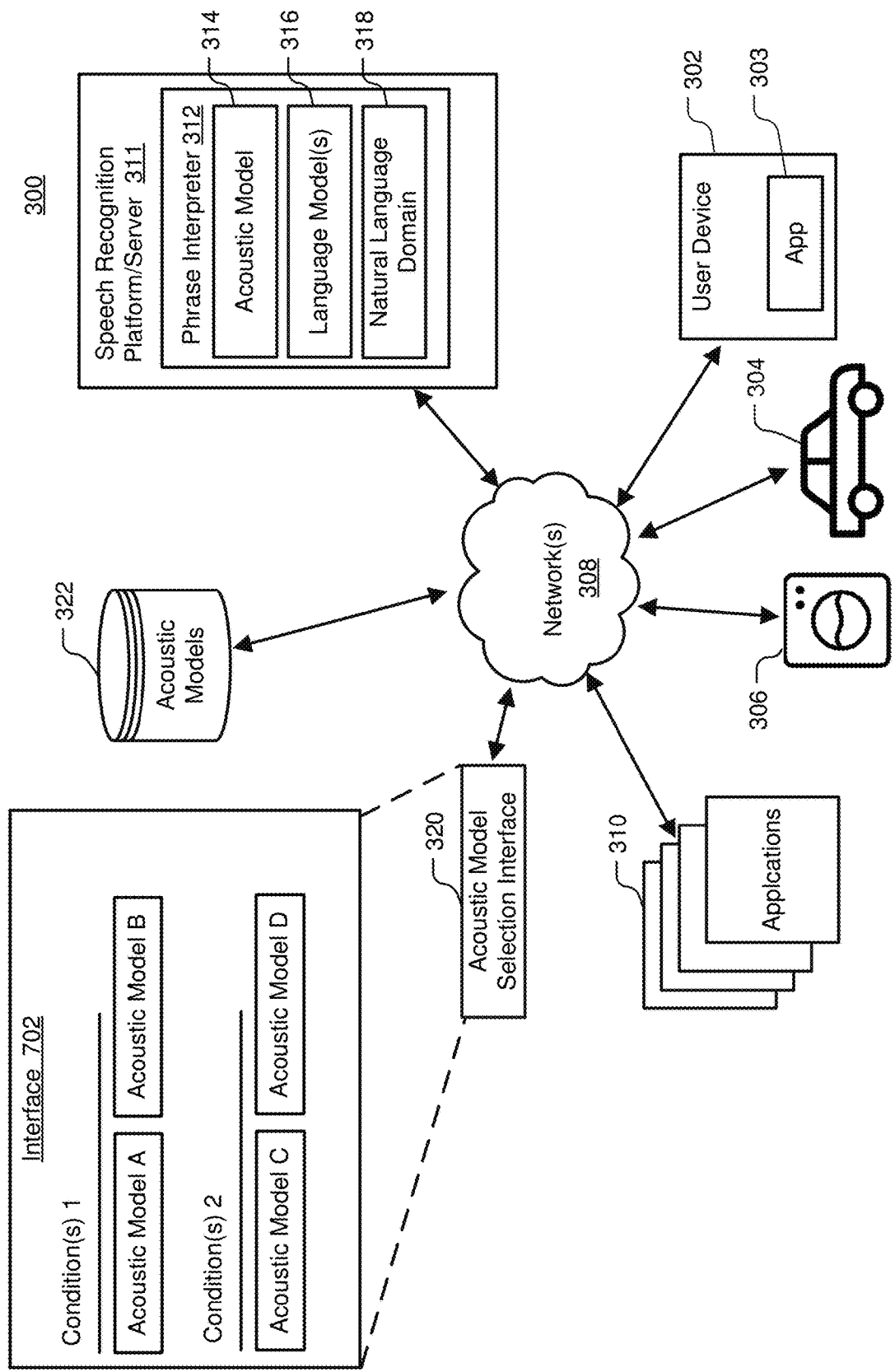
FIG. 7 illustrates an example implementation of the environment of FIG. 3, in which various acoustic models can be implemented.

FIG. 7 illustrates an example implementation of the environment of FIG. 3, in which various acoustic models can be implemented. In particular, FIG. 7 illustrates the environment 300 of FIG. 3 and further illustrates an interface 702 that can be used by a developer to select custom acoustic models for implementation and/or training, etc.

Specifically, FIG. 7 illustrates that the acoustic model selection interface 320 provides an interface 702 to a developer. The interface 702 can be a graphical user interface provided through a customized application or program, or it can be viewed through a web browser. A person of skill in the art will recognize the various types of interfaces encompassed by the interface 702. For example, the interface 702 could be a command line interface that responds to text instructions. Further, the interface 702 can allow the developer to select different models to implement for different types of conditions, device types, etc. In this example, the developer is able to select whether Acoustic Model A or Acoustic Model B should be implemented for a first condition. The first condition would be whether or not the user device (e.g., an espresso machine) is being used in a home environment or a business/commercial environment. The user device can also select either Acoustic Model C or Acoustic Model D for a second condition, which could be related to whether or not there are nearby appliances that make noise. For example, Acoustic Model C could be selected by the developer when a bean grinder is known or is expected to be nearby. In this example, let's say that the developer has selected Acoustic Model B (home use) and Acoustic Model C (bean grinder in close proximity).

Accordingly, Acoustic Models B and C can be stored in relation to a device ID, or any other type of identification discussed in this document. In an implementation where the phrase interpreter 312 selects the best acoustic model, then the Acoustic Models B and C can be transmitted and/or stored by the phrase interpreter 312, or the phrase interpreter 312 can be made aware of the locations of Acoustic Models B and C and be made aware that Acoustic Models B and C are the options for the espresso machine what that certain identifier (ID). Now the phrase interpreter 312 can select either Acoustic Model B or Acoustic Model C based on the metadata received along with the speech audio. Additionally, as mentioned above, the acoustic models can be mixed-and-matched (e.g., partially combined) to provide the best results.

Alternatively, Acoustic Model B and Acoustic Model C can be transmitted to the user device 302 (e.g., the espresso machine) so that the user device 302 can make the selection of the appropriate acoustic model. A developer of an application running on the user devices 302, 304, 306 may select the acoustic models from the interface 702.

The acoustic model selection interface 320 can also be capable of providing speech audio along with metadata to the speech recognition platform/server 311 as opposed to the speech audio and metadata going from the user devices 302, 304, 306 to the speech recognition platform/server 311.

For example, a developer could select, through the interface 702 that is running on a computer system, a set of at least two acoustic models (or just a single acoustic model)

appropriate for a specific type of user device (e.g., the washing machine 306). Then, at a later point, speech audio along with metadata that has been received by the acoustic model selection interface 320 can be transmitted to the speech recognition platform/server 311 via a computer system running the acoustic model selection interface 320 and/or from the user device. The speech recognition platform/server 311 then (using the phrase interpreter 312) provides the computer system running the acoustic model selection interface 320 meaningful instructions in dependence upon a selection of one of the acoustic models from the set. The phrase interpreter 312 is able to intelligently select one of the models from the set based on the metadata and then proceed to determine the meaningful instructions.

Alternatively, the computer system running the acoustic model selection interface 320 may select one of the acoustic models from the set of acoustic models in dependence upon the metadata or other information and then instruct the phrase interpreter 312 to implement the selected acoustic model.

Furthermore, the acoustic models presented to the developer on the interface 702 can be preselected so that they are acoustic models that are appropriate for the specific type of the user device. These acoustic models that are appropriate for the specific type of computing the can be preselected in dependence upon metadata received from or related to the specific type of user device in an active session with the user device. In other words, metadata received from a user device can be analyzed and the appropriate acoustic models can be preselected in dependence on the received metadata and then presented to the developer. The purpose of such an implementation is to not overwhelm the developer with acoustic models that are not relevant or to prevent the developer from selecting acoustic models that would be more detrimental than beneficial. Also, outside of an active session with a user device, the developer still may make selections of acoustic models appropriate for different types of user devices. In a similar manner as discussed above, the computing system running the acoustic model selection interface 320 can preselect acoustic models that are appropriate for each type of user device that the developer is configuring.

Moreover, the developers and/or manufacturers of the user devices 302, 304, 306 may have developed customized acoustic models or trained customized acoustic models that are tailored specifically for the types of user devices 302, 304, 306 and/or the environments or conditions in which the user devices 302, 304, 306 may or can be implemented. These customized models can be presented to the developer via the interface 702 for selection. An environment for training acoustic models is discussed below with reference to FIG. 8.

Figure 8:
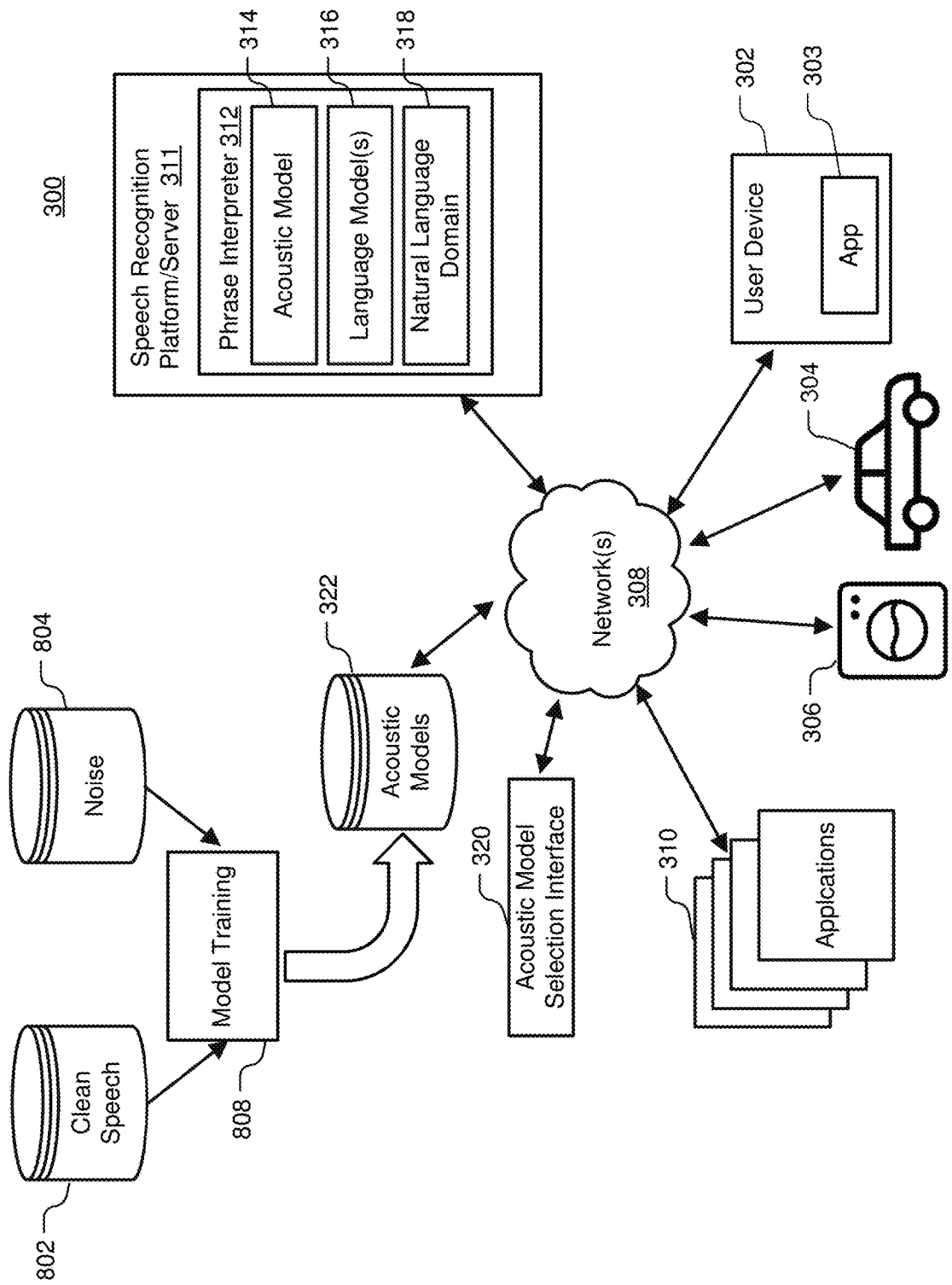
FIG. 8 illustrates an example implementation of the environment of FIG. 3, in which customized acoustic models can be trained.

FIG. 8 illustrates an example implementation of the environment of FIG. 3, in which customized acoustic models can be trained. In particular, FIG. 8 illustrates the environment 300 of FIG. 3 and also illustrates how acoustic models 322 can be trained prior to implementation.

Specifically, FIG. 8 illustrates that model training 808 can be performed by inputting training data such as clean speech 802 and noise 804 into an acoustic model. The acoustic models that are trained can be provided by the developer or manufacturer, or they can be generic models that are trained for implementation in specific types of devices and/or environments. The clean speech 802 can be generic or it can be specifically selected base on phrases that are expected to be received by the user devices 302, 304, 306. For example, different training speech is needed for different languages. Similarly, the noise 804 can be generic or it can be selected based on types of noises that would be expected in the operating environment of the user devices 302, 304, 306. The noise 804 can be provided by the developers and/or manufacturers. The developers and/or manufacturers can supply the noise 804 in the form of customized noise data or even a customized noise model that generates noises accordingly. The developers and/or manufacturers can also supply a customized acoustic model for immediate implementation as part of the acoustic models 322 and the developers and/or manufacturers can supply a customized acoustic model for further model training 808. Furthermore, clean speech 802 and/or noise 804 can be supplied to the developers and/or manufacturers so that the developers and/or manufacturers can train the acoustic models themselves and then eventually supply the customized and trained acoustic models for implementation from the acoustic models 322. The repository of acoustic models 322 can be parsed or separated to prevent security concerns one of developer's and/or manufacturer's model being implemented by another developer and/or manufacturer.

The developer and/or manufacturer can also train the acoustic models using an interface that is similar to the acoustic model selection interface 320. Once the acoustic models are trained, they can be selected using the interface 702 as discussed above with reference to FIG. 7.

Some embodiments are devices or serve devices, such as mobile phones, that can run in different software conditions such as by running different apps. The status of what app or apps are running is one type of condition that can be useful for selecting an appropriate acoustic model. For example, an email app is most often used in relatively low-noise environments. A navigation app might indicate the likely presence of vehicle road or street noise. An app that outputs audio such as a music player, video player, or game would favor an acoustic model that is resilient to background musical sounds.

Some embodiments are devices or serve devices that run in different physical or hardware conditions. For example, the geolocation or type of motion of mobile and portable devices is useful for guiding the selection of acoustic models. For example, devices in stadiums will favor acoustic models trained for background voices and devices in motion at high speed will favor acoustic models trained for road noise.

Essentially any type of sensor found in mobile phones such as light level sensors, accelerometers, microphones, cameras, satellite navigation (such as GPS) receivers, and Bluetooth receivers and any type of sensor found in automobiles such as cameras, LIDAR, geolocation, light level, traction level, and engine condition, can provide information useful for acoustic model selection.

Some embodiments gather commonly detectable device condition data and apply it to speech recordings, either online or offline, using either supervised or unsupervised machine learning algorithms to train models for selecting or adapting acoustic models for best accuracy in given device conditions.

Some embodiments select an acoustic model according to a device type, as encoded by metadata associated with speech audio. Some such embodiments have a general code for each of multiple types of devices, such as ones distinguishing between washing machine, coffee machine, and automobile. Some embodiments encode a model number as metadata, which is useful for distinguishing between a home coffee machine and a commercial coffee machine or distinguishing between sporty and luxury vehicles. Some embodiments encode a serial number that uniquely identifies each manufactured instance of a device. This can be useful for personalizing the selection of an acoustic model for the actual typical usage of the device. For example, some models of coffee maker are useful for home and office, which have different noise environments. Some devices are purchased by consumers with different accents. Selecting an acoustic model based on a device serial number can improve speech recognition accuracy if the chosen acoustic model favors people with the consumer's particular accent.

Some embodiments, such as vehicles and wearable devices, either sometimes or always operate without access to a speech recognition server through a network. Such embodiments perform speech recognition locally using one or more of multiple locally-stored acoustic models 322. Device type is not a particularly useful type of metadata, but device conditions are useful for the per-utterance selection of the best acoustic model for speech recognition.

Some embodiments that perform local speech recognition using a choice of acoustic model guided by metadata comprise storage elements that store metadata. For example, an automobile stores metadata indicating the position of the windows, status of the ventilation fan, and volume of its sounds system, all of which are useful in various embodiments for selection of an appropriate acoustic model. Using metadata that is stored within an embodiment for methods of selecting an acoustic model should be construed as being received for the purpose of carrying out the method.

Some network-connected server-based systems store appropriate acoustic models locally within devices and, for each utterance or for each detected change of condition choose a best acoustic model. When sending an utterance over the network to a speech recognition server, the system sends the acoustic model with the speech audio.

Some embodiments, such as ones for dictation, small vocabulary command recognition, keyword search, or phrase spotting perform speech recognition without natural language understanding and, in some embodiments, without using a language model.

Some embodiments are, or comprise, custom speech recognition platforms, such as SoundHound Houndify. These provide server-based speech recognition and, in some embodiments, also natural language processing and virtual assistant functionality. Platforms according to some embodiments provide interfaces for developers to customize the speech recognition for their particular devices. Some such platforms simply offer a selection of whether speech recognition should use near-field or far-field acoustic models. Some platforms offer numerous other configuration parameters such as selections of vocabulary size, numbers of microphones, application type, noise profile, and device price-point.

Some embodiments comprise methods of using such platform configuration interfaces to configure speech recognition for a type of device. Some companies developing speech-enabled systems use such platforms to configure the operation of server-based recognition for their client devices. Some companies use platforms to configure speech recognition software to run locally on devices. In either case, some platforms offer, and some developers use an ability to recognize test speech audio. Some such platforms and users provide test speech audio along with test metadata to observe and vary the intended performance of acoustic model selection for their devices and systems under development.

Some embodiments comprise one or more computer readable medium, such as hard disk drives, solid-state drives, or Flash RAM chips. Some devices designed to work with server systems comprise such computer readable medium that stores software to control the devices to make it perform detection of metadata useful for selection of acoustic models. This can be, for example, by reading from a device-local sensor or reading a stored device status value from a storage medium. Such software also controls the device to receive speech audio, transmit the speech audio and metadata to a server, and receive requested information back from the server. For example, the speech audio can be a request for a weather report and the received information would be a description of the weather report. For another example, the speech audio can be a request to send a text message and the received information would be a data structure that controls the device to perform a text message creation function.

For purposes of the present invention, the passive act of having data in a storage medium should be construed as an act of storing, regardless of who wrote the data to the storage medium and when or how the writing occurred.

Figure 9:
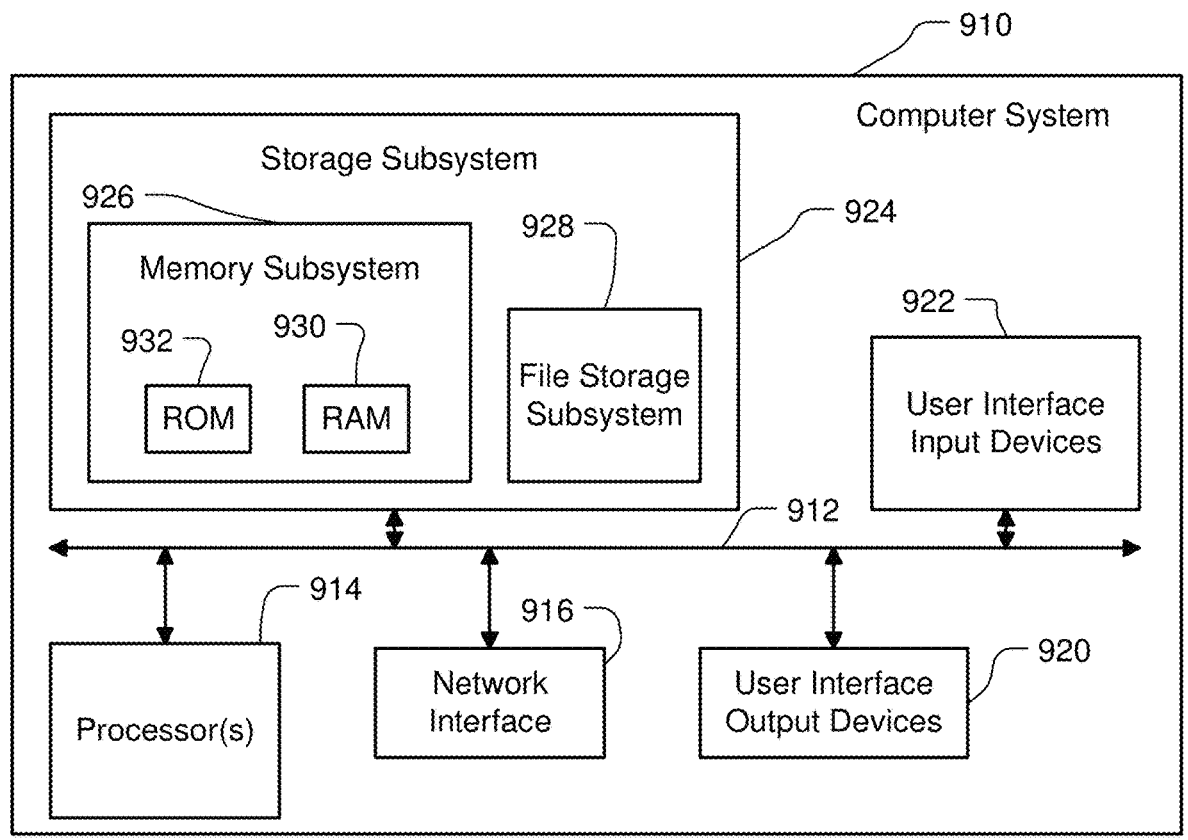
FIG. 9 is a block diagram of an example computer system that can implement various components of the environment of FIG. 3.

FIG. 9 is a block diagram of an example computer system that can implement various components of the environment 300 of FIG. 3. Computer system 910 typically includes at least one processor 914, which communicates with a number of peripheral devices via bus subsystem 912. These peripheral devices may include a storage subsystem 924, comprising for example memory devices and a file storage subsystem, user interface input devices 922, user interface output devices 920, and a network interface subsystem 916. The input and output devices allow user interaction with computer system 910. Network interface subsystem 916 provides an interface to outside networks, including an interface to communication network 308, and is coupled via communication network 308 to corresponding interface devices in other computer systems.

User interface input devices 922 may include a keyboard, pointing devices such as a mouse, trackball, touchpad, or graphics tablet, a scanner, a touchscreen incorporated into the display, audio input devices such as speech recognition systems, microphones, and other types of input devices. In general, use of the term "input device" is intended to include all possible types of devices and ways to input information into computer system 910 or onto communication network 308.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD- ROM drive, an optical drive, or removable media cartridges. The modules implementing the functionality of certain embodiments may be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative embodiments of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating the various embodiments. Many other configurations of computer system 910 are possible having more or fewer components than the computer system depicted in FIG. 9.

Some Particular Implementations

We describe various implementations for performing speech recognition.

The technology disclosed can be practiced as a system, method, or article of manufacture (a non-transitory computer readable medium storing code). One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions that perform various operations. A CRM implementation of the technology discloses includes a non-transitory computer readable medium storing code that, if executed by one or more computers, would cause the one or more computers to perform various operations. The system implementation and the CRM implementation are capable of performing any of the method implementations described below.

In one implementation a method of performing speech recognition for a plurality of different devices s provided. The method includes storing a plurality of acoustic models associated with different device conditions, receiving speech audio including natural language utterances, receiving metadata indicative of a device condition, selecting an acoustic model from the plurality of acoustic models, the acoustic model being selected in dependence upon the received metadata indicative of the device condition, and employing the selected acoustic model to recognize speech from the natural language utterances included in the received speech audio.

In another implementation, a method of performing speech recognition for a plurality of different devices is provided. The method includes storing a plurality of acoustic models associated with different device types, receiving speech audio including natural language utterances, receiving metadata indicative of a device type, selecting an acoustic model from the plurality of acoustic models, the acoustic model being selected in dependence upon the received metadata indicative of the device type, and employing the selected acoustic model to recognize speech from the natural language utterances included in the received speech audio.

Further, in a different implementation of a method of providing a platform for configuring device-specific speech recognition is provided. The method includes providing a user interface for developers to select a set of at least two acoustic models appropriate for a specific type of a device, receiving, from a developer, a selection of the set of the at least two acoustic models, and configuring a speech recognition system to perform device-specific speech recognition.

In another implementation, a method of configuring a speech recognition system to perform device-specific speech recognition is provided. The method includes receiving, from a device of a specific device type, speech audio including natural language utterances and metadata associated with the received speech audio, selecting one acoustic model of at least two acoustic models in dependence upon the received metadata, and using the selected acoustic model to recognize speech from the natural language utterances included in the received speech audio.

In a further implementation, a method of using a platform for configuring device-specific speech recognition is provided. The method includes selecting, through a user interface provided by a computer system, a set of at least two acoustic models appropriate for a specific type of a device, providing speech audio with metadata to a speech recognition system associated with the platform, and receiving meaningful instructions from the computer speech recognition system, wherein the meaningful instructions are created by the speech recognition system in dependence upon a selection of one of the acoustic models from the set.

In another implementation, a non-transitory computer readable medium storing code is provided. The code, if executed by one or more computers, would cause the one or more computers to detect information useful for selecting an acoustic model and indicative of a device condition, receive speech audio, transmit the detected information and the received speech audio, and receive information requested by speech in the speech audio, wherein the detected information is capable of being employed to select the acoustic model from a plurality of acoustic models associated with different device conditions, and wherein the selected acoustic model is used to recognize speech from the transmitted speech audio.

Features applicable to systems, methods, and articles of manufacture are not repeated for each statutory class set of base features. The reader will understand how features identified in this section can readily be combined with base features in other statutory classes.

We claim as follows:
1. A method comprising:
   providing a user interface for developers to select between a standard acoustic model and a custom acoustic model;
   receiving, from a developer, one or more audio files of custom recordings appropriate for a specific device;
   training the custom acoustic model from a baseline acoustic model tuned to the custom recordings;
   receiving, from the developer, a selection of the custom acoustic model; and
   deploying the custom acoustic model for speech recognition by the specific device.

2. The method of claim 1 wherein the one or more audio files of custom recordings contain custom noise and the baseline acoustic model is based on clean speech.

3. The method of claim 1 further comprising:
performing automatic speech recognition of speech in the one or more audio files using the standard acoustic model to determine a first transcription;
performing automatic speech recognition of speech in the one or more audio files using the custom acoustic model to determine a second transcription; and
providing an output to a visual display showing differences between the first transcription and the second transcription.

4. The method of claim 1 further comprising:
receiving, from the developer, labeled transcription data corresponding to the one or more audio files;
performing automatic speech recognition of speech in the one or more audio files using the custom acoustic model to determine machine transcription data;
comparing the labeled transcription data to the machine transcription data to compute an error rate; and
providing the error rate to a developer.

* * * * *